Aug. 8, 1933.    L. SIMON ET AL    1,921,951
SHOCK ABSORBER
Filed July 18, 1932
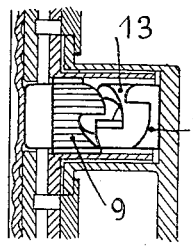
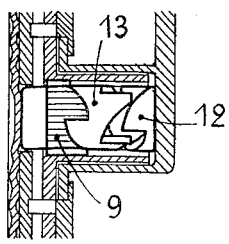
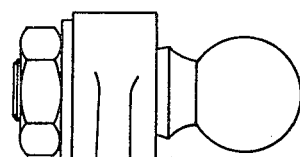
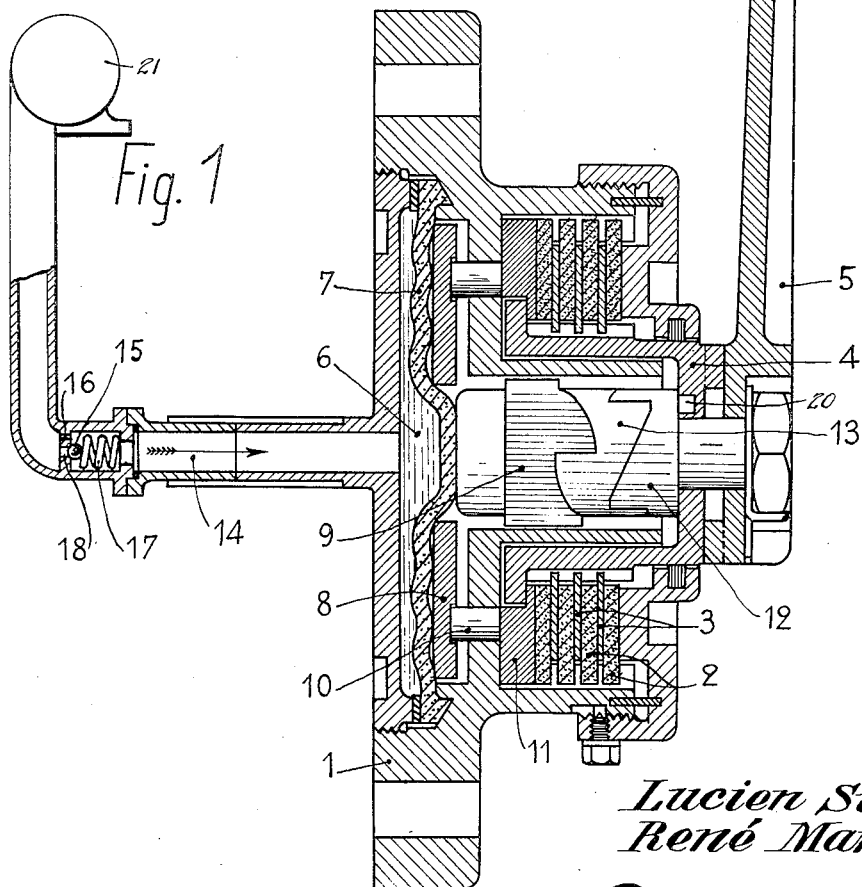
Lucien Simon
René Marcon
INVENTORS.
ATTORNEYS.

Patented Aug. 8, 1933

1,921,951

UNITED STATES PATENT OFFICE 1,921,951

SHOCK ABSORBER

Lucien Simon and René Marcon, Paris, France; said Marcon assignor, by mesne assignments, to said Simon Application July 18, 1932, Serial No. 623,263, and in France June 9, 1932

4 Claims. (Cl. 188—130)

The present invention has for its object a shock absorber for all kinds of vehicles, railway cars, locomotives, automotive cars, automobiles for use on railway tracks, on roads, or otherwise, flying machines and other uses, which shock absorber is remarkable in that it operates automatically in synchronism according to the speed of the vehicle and the unevennesses of the ground on which the vehicle is moving.

The shock absorber according to our invention is characterized in that it comprises a circular casing in which are fitted alternate sets of braking rings or discs which are slidably keyed on the inner periphery of the casing and on the outer periphery of a concentric hub fixed to the movable arm of the shock absorber respectively. Said hub is provided with projections having inclined helical outlines of suitable pitch, interlocking with corresponding projections having the same outline provided on a movable intermediate piece. Said piece is provided on its opposite face with similar projections having helical inclined surfaces the inclination of which is the reverse of that of the first mentioned projections and which are adapted to interlock with corresponding projections provided on a piston slidably keyed so as to move axially in said casing. The casing comprises a chamber containing a suitable fluid, oil for instance, compressed through a suitable organ to a pressure which is a function of the speed of the vehicle. Said chamber is closed by one or several elastic membranes, one of which is in contact with the above mentioned piston so as to modify the pressure of the liquid contained in said chamber. Either one part of the only membrane present in said chamber or the other membrane or membranes are connected, either directly, or through suitable pieces with the movable braking elements to which they transmit the variable pressure of the liquid contained in said chamber.

Preferred embodiments of our invention will be hereinafter described with reference to the accompanying drawing, given merely by way of example, and in which:

Fig. 1 is a cross section of a shock absorber according to our invention;

Figs. 2 and 3 are perspective views illustrating the operation of the inclined projections provided on the different parts of the shock absorber.

In the embodiment of our invention shown in the accompanying drawing, the apparatus comprises a complete shock absorber including a casing 1 provided with the usual parts through which it may be secured to the vehicle. In said casing are disposed two alternate series of braking discs 2, 3, which are slidably keyed to the inner periphery of casing 1 and to the outer periphery of a hub 4 concentrically mounted in said casing. Said hub 4 is rigidly fixed to the movable arm 5 of the shock absorber which is connected to the axles of the vehicles the displacements of which must be deadened with respect to the frame when shocks occur as a result of the unevenness of the road and of the inertia of the vehicle.

A chamber 6 adapted to contain oil under pressure fed through pipe 14 is closed on one of its sides by an elastic membrane 7 resting upon a disc 8 and upon a piston 9 slidably keyed so as to move axially in casing 1. Said piston is provided with projections having helical inclined surfaces interlocking with corresponding projections provided on a piece 13. The opposite face of said piece 13 is also provided with projections having helically inclined surfaces interlocking with corresponding projections provided in a piece 12 rigidly fixed to hub 4 by means of lug 20 provided on piece 12 and extending into hub 4. The two last mentioned series of interlocking projections are inclined in opposite directions as compared with the two first mentioned interlocking projections. Disc 8 is connected through push pieces 10 to an annular piece 11 adapted to act on the braking discs 2 and 3.

The oil chamber 6 is fed through a suitable organ, a pump 21 for instance, which feeds oil or another fluid under a pressure that is preferably a function of the speed of the vehicle. A check valve serves to separate for a certain time the oil chamber 6 from the remainder of the device so as to prevent a sudden egress of oil from chamber 6 as a result of an excess of pressure. Said check valve may for instance consist of a ball 15 pushed by a spring 17 against its seat 18. When ball 15 is applied against its seat 18, the oil is allowed to flow slowly through a small orifice 16 the diameter of which is chosen in accordance with the desired time of discharge.

The operation of the shock absorber according to our invention is as follows:

The liquid, which may be a special oil or any other suitable fluid, is subjected to a manometric pressure corresponding to the speed of the vehicle and is conveyed through pipe 14 into chamber 6 where it is present under said pressure. That pressure is imparted to braking discs 2 and 3 through disc 8, push pieces 10 and annular piece 11. The braking action of lever 5 is a function of the frictional stresses generated between the faces of discs 2 and 3, which are subjected to the variable pressure exerted laterally by the oil present in chamber 6. The braking action of lever 5 is also a function of the angular position of lever 5 with respect to the inclined surfaces of pieces 9, 12 and 13. This is due to the fact that, as shown in Fig. 2, owing to the very arrangement of said inclined surfaces, when lever 5 is rotated in one direction, the action of the inclined surfaces of piece 13 on those of piece 9 causes said piston 9 to move toward the left hand side of the drawing. Likewise, when lever 5 is rotated in the opposite direction, the action of the inclined surfaces of piece 12 on the corresponding surfaces of piece 13 also causes piston 9 to move toward the left hand side of the drawing. Now, any displacement of piston 9 in that direction reduces the volume of chamber 6 and correspondingly increases the oil pressure in said chamber, and consequently the pressure exerted on the braking discs 2 and 3.

It therefore follows that for equal angular displacements of lever 5, the braking power will be so much the stronger as the oil pressure in chamber 6 is great, and that, on the contrary, if it be supposed that the oil pressure in chamber 6 remains constant owing to the above mentioned devices that are normally intended to insure that constancy, the braking power will be so much the greater as the angular displacements of arm 5 of the shock absorber are more important.

It should be noted that the angular length of the inclined surfaces of pieces 9, 12 and 13 will vary according to the case, like the pitch of said inclined surfaces.

While we have described what we deem to be a preferred embodiment of our invention, it should be well understood that we do not wish to be limited thereto as there might be changes made in the arrangement, disposition and form of the parts without departing from the principle of our invention as comprehended within the scope of the appended claims.

What we claim is:

1. A shock absorber for a vehicle comprising in combination, a casing fixed to said vehicle, a rotary hub coaxially mounted in said casing, an arm rigidly fixed to said hub, two sets of alternate braking discs slidably keyed to the inner periphery of said casing and to the outer periphery of said hub respectively, a chamber means for feeding a fluid under pressure into said chamber, means sensitive to said fluid pressure adapted to press said braking discs against each other, and means operatively connected to said arm for varying the pressure in said chamber according to the angular position of said arm.

2. A shock absorber for a vehicle comprising in combination, a casing fixed to said vehicle, a rotary hub coaxially mounted in said casing, an arm rigidly fixed to said hub, two sets of alternate braking discs slidably keyed to the inner periphery of said casing and to the outer periphery of said hub respectively, a chamber means for feeding a fluid under pressure into said chamber, a flexible membrane forming a wall of said chamber, means for transmitting the pressure of said membrane to said alternate sets of braking discs so as to press them against each other, a piston slidably mounted in said hub and bearing against the central part of said membrane, and means operatively connected to said arm for moving said piston in said hub according to the angular position of said arm.

3. A shock absorber for a vehicle comprising in combination, a casing fixed to said vehicle, a rotary hub coaxially mounted in said casing, an arm rigidly fixed to said hub, two sets of alternate braking discs slidably keyed to the inner periphery of said casing and to the outer periphery of said hub respectively, a chamber in said casing, means for feeding a fluid under pressure to said chamber, a flexible membrane forming a wall of said chamber, means for transmitting the pressure of said membrane to said alternate sets of braking disks so as to press them against one another, a piston slidably mounted in said hub and bearing against the central part of said membrane, projections having helical inclined surfaces on the face of said piston that is not in contact with said mebrane, a piece integral with said arm disposed in said hub, projections having helical surfaces inclined in the opposite direction with respect to the above mentioned projections on the inner face of said piece, and an intermediate piece disposed between said piston and the above named piece, said last mentioned piece being provided with inclined surfaces adapted to correspond with the inclined surfaces of the above mentioned projections respectively.

4. A shock absorber according to claim 3 in which there is a check valve in said pipe, and means for allowing the fluid to flow slowly from one side of said check valve to the other side.

LUCIEN SIMON.
RENÉ MARCON.